United States Patent
Brunet et al.

(10) Patent No.: US 7,401,320 B2
(45) Date of Patent: Jul. 15, 2008

(54) OPERATOR NETWORK THAT ROUTES CUSTOMER CARE CALLS BASED ON SUBSCRIBER/DEVICE PROFILE AND CSR SKILL SET

(75) Inventors: Jeffrey Brunet, Richmond Hill (CA); Ian Collins, Markham (CA); Yousuf Chowdhary, Maple (CA); Bindu Rama Rao, Laguna Niguel, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/247,459

(22) Filed: Oct. 11, 2005

(65) Prior Publication Data

US 2006/0143058 A1    Jun. 29, 2006

Related U.S. Application Data

(60) Provisional application No. 60/618,849, filed on Oct. 13, 2004.

(51) Int. Cl.
*G06F 9/44* (2006.01)

(52) U.S. Cl. ............... 717/101; 379/265.1; 379/266.01; 379/88.16; 370/356

(58) Field of Classification Search .............. 717/101; 379/88.16, 218.01, 88.18, 265.01, 265.11, 379/266.01, 265.1; 370/356, 401; 455/414.3; 705/11
See application file for complete search history.

(56) References Cited

U.S. PATENT DOCUMENTS

| | | | | |
|---|---|---|---|---|
| 5,261,055 A | 11/1993 | Moran et al. | ................ | 395/275 |
| 5,442,771 A | 8/1995 | Filepp et al. | ................ | 395/650 |
| 5,479,637 A | 12/1995 | Lisimaque et al. | .......... | 395/430 |
| 5,563,931 A * | 10/1996 | Bishop et al. | ............ | 455/404.1 |
| 5,579,522 A | 11/1996 | Christeson et al. | .......... | 395/652 |
| 5,596,738 A | 1/1997 | Pope | ........................... | 395/430 |
| 5,598,534 A | 1/1997 | Haas | ..................... | 395/200.09 |
| 5,608,910 A | 3/1997 | Shimakura | .................. | 395/670 |
| 5,623,604 A | 4/1997 | Russell et al. | ............ | 395/200.1 |
| 5,666,293 A | 9/1997 | Metz et al. | ............... | 395/200.5 |
| 5,704,031 A | 12/1997 | Mikami et al. | ......... | 395/182.02 |
| 5,752,039 A | 5/1998 | Tanimura | .................... | 395/712 |
| 5,778,440 A | 7/1998 | Yiu et al. | .................... | 711/154 |
| 5,790,974 A | 8/1998 | Tognazzini | .................. | 701/204 |
| 5,826,012 A | 10/1998 | Lettvin | ........................ | 395/186 |
| 5,878,256 A | 3/1999 | Bealkowski et al. | ........ | 395/652 |

(Continued)

FOREIGN PATENT DOCUMENTS

CA    2339923    3/2000

(Continued)

OTHER PUBLICATIONS

Problem Tracking Task Reference, Continuus Software Corporation, Whole Manual, Part No. PTTR-041-011, 1996.*

(Continued)

*Primary Examiner*—Todd Ingberg

(57) ABSTRACT

An operator network is capable of routing incoming customer care calls to specific customer care representatives based on a subscriber profile and customer service representative (CSR) skill set. The device profile is retrieved from the mobile handset while the incoming customer care call is in a queue waiting to be connected to a CSR. The retrieved device profile is also used to determine an appropriate CSR to handle an incoming customer care call.

23 Claims, 5 Drawing Sheets

U.S. PATENT DOCUMENTS

| | | | | |
|---|---|---|---|---|
| 5,944,839 | A | 8/1999 | Isenberg | 714/26 |
| 5,960,445 | A | 9/1999 | Tamori et al. | 707/203 |
| 6,009,497 | A | 12/1999 | Wells et al. | 711/103 |
| 6,021,428 | A * | 2/2000 | Miloslavsky | 709/206 |
| 6,038,636 | A | 3/2000 | Brown, III et al. | 711/103 |
| 6,058,435 | A * | 5/2000 | Sassin et al. | 719/331 |
| 6,064,814 | A | 5/2000 | Capriles et al. | 395/701 |
| 6,070,142 | A * | 5/2000 | McDonough et al. | 705/7 |
| 6,073,206 | A | 6/2000 | Piwonka et al. | 711/102 |
| 6,073,214 | A | 6/2000 | Fawcett | 711/133 |
| 6,081,518 | A * | 6/2000 | Bowman-Amuah | 370/352 |
| 6,088,759 | A | 7/2000 | Hasbun et al. | 711/103 |
| 6,105,063 | A | 8/2000 | Hayes, Jr. | 709/223 |
| 6,112,024 | A | 8/2000 | Almond et al. | 395/703 |
| 6,112,197 | A | 8/2000 | Chatterjee et al. | 707/3 |
| 6,115,693 | A * | 9/2000 | McDonough et al. | 705/10 |
| 6,126,327 | A | 10/2000 | Bi et al. | 395/200.51 |
| 6,128,695 | A | 10/2000 | Estakhri et al. | 711/103 |
| 6,134,530 | A * | 10/2000 | Bunting et al. | 705/7 |
| 6,157,559 | A | 12/2000 | Yoo | 365/52 |
| 6,163,274 | A | 12/2000 | Lindgren | 340/825.44 |
| 6,178,452 | B1 | 1/2001 | Miyamoyo | 709/224 |
| 6,198,946 | B1 | 3/2001 | Shin et al. | 455/561 |
| 6,233,332 | B1 * | 5/2001 | Anderson et al. | 379/265.09 |
| 6,279,153 | B1 | 8/2001 | Bi et al. | 717/11 |
| 6,311,322 | B1 | 10/2001 | Ikeda et al. | 717/1 |
| 6,333,980 | B1 * | 12/2001 | Hollatz et al. | 379/265.12 |
| 6,393,018 | B2 * | 5/2002 | Miloslavsky | 370/352 |
| 6,426,955 | B1 * | 7/2002 | Dalton et al. | 370/401 |
| 6,438,585 | B2 | 8/2002 | Mousseau et al. | 709/206 |
| 6,449,270 | B1 * | 9/2002 | Miloslavsky | 370/356 |
| 6,477,531 | B1 * | 11/2002 | Sullivan et al. | 707/10 |
| 6,530,036 | B1 | 3/2003 | Frey, Jr. | 714/7 |
| 6,542,504 | B1 * | 4/2003 | Mahler et al. | 370/392 |
| 6,553,113 | B1 * | 4/2003 | Dhir et al. | 379/265.02 |
| 6,581,105 | B2 * | 6/2003 | Miloslavsky et al. | 709/238 |
| 6,603,854 | B1 * | 8/2003 | Judkins et al. | 379/265.06 |
| 6,606,744 | B1 * | 8/2003 | Mikurak | 717/174 |
| 6,615,240 | B1 * | 9/2003 | Sullivan et al. | 709/205 |
| 6,668,049 | B1 * | 12/2003 | Koch et al. | 379/211.02 |
| 6,687,341 | B1 * | 2/2004 | Koch et al. | 379/88.17 |
| 6,694,314 | B1 * | 2/2004 | Sullivan et al. | 707/10 |
| 6,704,303 | B1 * | 3/2004 | Bowman-Amuah | 370/352 |
| 6,714,642 | B2 * | 3/2004 | Dhir et al. | 379/265.02 |
| 6,754,181 | B1 * | 6/2004 | Elliott et al. | 370/252 |
| 6,763,104 | B1 * | 7/2004 | Judkins et al. | 379/265.09 |
| 6,798,876 | B1 * | 9/2004 | Bala | 379/265.12 |
| 6,850,614 | B1 * | 2/2005 | Collins | 379/265.09 |
| 6,879,685 | B1 * | 4/2005 | Peterson et al. | 379/265.11 |
| 6,956,846 | B2 * | 10/2005 | Lewis et al. | 370/352 |
| 6,981,020 | B2 * | 12/2005 | Miloslavsky et al. | 709/204 |
| 6,996,603 | B1 * | 2/2006 | Srinivasan | 709/204 |
| 6,999,990 | B1 * | 2/2006 | Sullivan et al. | 709/205 |
| 7,002,919 | B1 * | 2/2006 | El-Sayed | 370/252 |
| 7,027,586 | B2 * | 4/2006 | Bushey et al. | 379/265.09 |
| 7,050,566 | B2 * | 5/2006 | Becerra et al. | 379/265.12 |
| 7,062,031 | B2 * | 6/2006 | Becerra et al. | 379/265.01 |
| 7,076,051 | B2 * | 7/2006 | Brown et al. | 379/265.09 |
| 7,103,172 | B2 * | 9/2006 | Brown et al. | 379/266.01 |
| 7,110,525 | B1 * | 9/2006 | Heller et al. | 379/265.11 |
| 7,145,898 | B1 * | 12/2006 | Elliott | 370/352 |
| 7,146,002 | B1 * | 12/2006 | Smith et al. | 379/265.13 |
| 7,230,951 | B2 * | 6/2007 | Mizell et al. | 370/401 |
| 7,277,529 | B1 * | 10/2007 | Wuthnow et al. | 379/88.14 |
| 2001/0029178 | A1 | 10/2001 | Criss et al. | 455/419 |
| 2001/0047363 | A1 | 11/2001 | Peng | 707/104.1 |
| 2001/0048728 | A1 | 12/2001 | Peng | 375/354 |
| 2002/0053044 | A1 | 5/2002 | Gold et al. | 714/15 |
| 2002/0078209 | A1 | 6/2002 | Peng | 709/227 |
| 2002/0116261 | A1 | 8/2002 | Moskowitz et al. | 705/14 |
| 2002/0124209 | A1 | 9/2002 | Faust et al. | 714/45 |
| 2002/0131404 | A1 | 9/2002 | Mehta et al. | 370/352 |
| 2002/0152005 | A1 | 10/2002 | Bagnordi | 700/234 |
| 2002/0156863 | A1 | 10/2002 | Peng | 709/217 |
| 2002/0157090 | A1 | 10/2002 | Anton, Jr. | 717/178 |
| 2003/0005362 | A1 | 1/2003 | Miller et al. | 714/47 |
| 2003/0033599 | A1 | 2/2003 | Rajaram et al. | 717/173 |
| 2003/0037075 | A1 | 2/2003 | Hannigan et al. | 707/500 |
| 2003/0061384 | A1 | 3/2003 | Nakatani | 709/245 |
| 2003/0084283 | A1 | 5/2003 | Pixton | 713/163 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |

OTHER PUBLICATIONS

"Focus on OpenView A guide to Hewlett-Packard's Network and Systems Management Platform", Nathan J. Muller, pp. 1-291, CBM Books, published 1995.

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1st ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

OPERATOR NETWORK THAT ROUTES CUSTOMER CARE CALLS BASED ON SUBSCRIBER/DEVICE PROFILE AND CSR SKILL SET

RELATED APPLICATIONS

This application makes reference to, claims priority to, and claims the benefit of U. S. Provisional Patent Application Serial No. 60/618,849, entitled "OPERATOR NETWORK THAT ROUTES CUSTOMER CARE CALLS BASED ON SUBSCRIBER/DEVICE PROFILE AND CSR SKILL SET", filed Oct. 13, 2004, the complete subject matter of which is hereby incorporated herein by reference, in its entirety.

The present application makes reference to PCT Application with publication number WO/02/41147 A1, PCT number PCT/US01/44034, filed 19 Nov. 2001, and U.S. provisional application 60/249,606 filed 17 Nov. 2000, both of which are incorporated by reference in their entirety. The present application also makes reference to U.S. provisional applications, Ser. No. 60/461,886, filed on Apr. 11, 2003, Ser. No.: 60/525,794 filed on Dec. 1, 2003 and Ser. No. 60/534,426 filed on Jan. 7, 2004, all of which are hereby incorporated by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Smartphones are devices running feature rich operating systems such as Symbian, PalmOS, Microsoft WinCE, BREW (Binary Runtime Environment for Wireless) and Java MIDP compliant devices. Due to the complex nature and multitude of new features, these Smartphone devices are difficult to configure; compounded with limited keyboards, entering information such as personal details and configuration settings is not only difficult but also highly prone to human errors. A combination of complex features and associated configuration requirements requires great improvement upon current customer support solutions for wireless network operators.

With the wide availability of downloadable services and applications available for Smartphone users and the increasing costs of customer care, ensuring efficient and less-cumbersome support when problems arise is an increasing necessity. In contrast to traditional customer service applications that are available in Contact Center's today, CSRs (Customer Service Representatives) must undertake the extensive and time-consuming task of asking customer's complex questions pertaining to their wireless devices for problem diagnosis. This requires CSRs to be experts on Smartphones and their applications, and also requires customers to spend increased time on the telephone to receive support for their applications. The result is increased support costs, increased call handling times, complex diagnostic processes and overall frustration.

The current method of call routing is based on a simple queue where the next available CSR gets the next call. In this method there is no specialization since each CSR can get a call related to any phone or problem. Each CSR is a generalist and tries to solve all sorts of problems.

Gathering and obtaining Smartphone information required for diagnostics is manual and therefore complex, time consuming and prone to human errors. This problematic approach is an ineffective method of just-in-time customer support and does not guarantee effective problem resolution. This current method of call routing leave both the subscribers and customer support staff frustrated. In addition, obtaining diagnostic information requires a specialized support staff and Contact Centers must therefore hire and train specialized staff for specific tasks. For the Service Provider this means increased hiring and operational costs.

The customer support process is increasing in complexity. The level of expertise required by the CSR to understand numerous Smartphone devices and to search for up-to-date configuration data leads to increased costs in training, call-durations, and the overall operational costs.

With the emergence of Smartphones and wireless PDAs and their ability to download and install applications, the wireless industry is poised to see explosive growth in application usage by subscribers. Mobile operator customer care centers are focused on solutions for closed, voice-centric mobile phones. This infrastructure is not suited to efficiently solve the intelligent mobile data device and application problems described above. The proliferation of next generation "Smartphone" devices and the level of issues and problem solving needed has made existing customer care applications obsolete or unsuitable to meet these emerging business needs.

In general, incoming calls from callers to a call center supported by an operator network goes into a queue, called the incoming call queue. Irrespective of phone and subscriber profile each person who responds to a call is a generalist. Often, nothing is known about the subscriber, and even less about the subscriber's device, when a subscriber makes a call for customer service into an operator's call center. Several minutes are initially taken up just to collect the most basic information about the subscriber and the subscriber's device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for routing customer care calls such that the right customer service representative receives an incoming customer care call, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

The numerous objects and advantages of the present invention may be better understood by those skilled in the art by reference to the accompanying figures in which.

DETAILED DESCRIPTION OF THE INVENTION

Aspects of the present invention relate generally to the routing of calls to customer care, and, more specifically, to the use of an intelligent routing system for routing such customer care calls such that the right customer service representative receives an incoming customer care call. The following discussion makes reference to the term "electronic device" that is used herein to refer to mobile electronic devices such as, for example, a mobile handset, a cellular phone, a personal digital assistant (PDA), a pager, and a personal computer, to name just a few. Although the listed example electronic devices are mobile devices, application of the present invention is not limited in this manner, as representative embodiments of the present invention may be employed in a wide variety of electronic devices, both fixed and mobile. The following discussion makes reference to the term "customer care system" that is used herein to refer to customer facing systems such as, for example, those maintained by an wireless network operator, or an enterprise. The following discussion also makes reference to the term "network" that is used herein to refer to networks such as, for example, an operator network, an enterprise network, an Internet based network, a management network for a service, etc.

Electronic devices may be adapted to access servers to retrieve update information for updating memory in the electronic devices. An electronic device may be, for example, a mobile electronic device having firmware/software such as mobile cellular phone handsets, personal digital assistants (PDAs), pagers, MP-3 players, digital cameras, to name just a few. Update information may comprise information that modifies or changes firmware/software and/or software components installed in the electronic device. In a representative embodiment of the present invention, update information may comprise a set of executable instructions for converting a first version of code to an updated/second version of code. The update information may add new services to the electronic device, as desired by a service provider, device manufacturer, or an end-user, and/or may fix bugs (e.g., errors) in the operating code of the electronic device. In a representative embodiment of the present invention, update information may comprise an update package.

A customer care representative may help diagnose a problem with a device and update the configurations, settings, parameters, firmware, etc. in the device. The user experience in dealing with a customer care representative is improved by a system built in accordance with the present invention.

Figure 1:
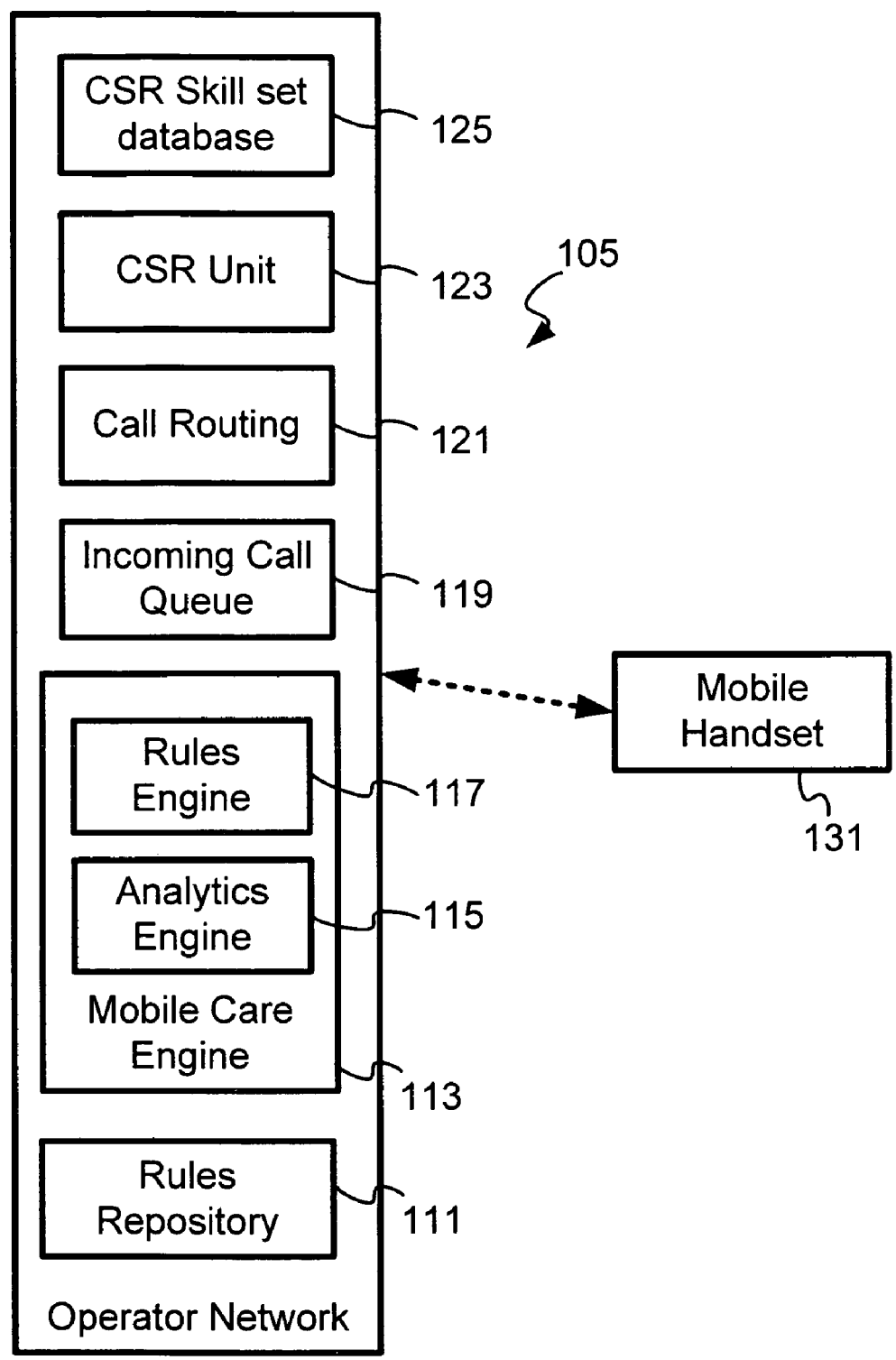
FIG. 1 is a perspective block diagram of an operator network that is capable of routing incoming customer care calls based on subscriber profile and customer service representative (CSR) skill set, the customer care calls originating from a mobile handset.

FIG. 1 is a perspective block diagram of an operator network 105 that is capable of routing incoming customer care calls based on subscriber profile and customer service representative (CSR) skill set, the customer care calls originating from a mobile handset 131. The operator network 105 comprises a rules repository 111, a mobile care engine 113, an incoming call queue 119, a call routing unit 121, a CSR unit 123 and a CSR Skill set database 125. The mobile care engine 113 comprises an analytics engine 115 and a rules engine 117.

The operator network 105 is capable of routing incoming customer care calls to specific customer care representatives (CSRs) based on a subscriber profile and customer service representative (CSR) skill set. A device profile is retrieved from the mobile handset while the incoming customer care call is in a queue waiting to be connected to a CSR. The retrieved device profile is also used to determine an appropriate CSR.

In general, the operator network 105 implements a call routing system that relies on the fact that each CSR, if limited to a narrower scope of problems, can become an expert over time and will require less and less time to solve the same problem or trouble shoot a particular phone or particular OS based devices. Each CSR is assumed to employ one of the CSR units 123 available in the operator network 105 to conduct their work. Information on what skills a CSR possesses or what types of problems or what devices they are good at solving is maintained in the CSR skill set database 125. The CSR skill set database 125 is continuously updated in one embodiment.

When a user employs the mobile handset 131 to report a problem or seek help from a CSR, the incoming call is queued up by the operator network 105 into the incoming call queue 119. The incoming call is typically put on hold, or made to wait, in the incoming call queue 119 until a CSR is assigned to the incoming call. The call routing unit 121 determines the CSR to be assigned the incoming call from the mobile handset 131, while the incoming call is put on hold or made to wait in the incoming call queue 119. While the user waits to be connected to the CSR, such as a CSR currently using the CSR unit 123, in one embodiment, the call routing unit 121 solicits a device profile from the mobile handset 131. It process the user profile received to determine the appropriate CSR to forward the incoming customer service call from the mobile handset 131.

In another related embodiment, while the user waits to be connected to the CSR, such as a CSR currently using the CSR unit 123, the call routing unit 121 retrieves a device profile from the mobile handset 131 and checks the mobile care engine 113 to determine which CSR unit 123 to connect the incoming call to.

The analytics engine 115 is based on analytic rules that are automatically generated or entered manually. Similarly, the rules engine 117 is based on rules that are automatically generated or manually entered or both.

In general, the mobile care engine 113 is capable of processing the device profile retrieved from the mobile handset 131, and rules retrieved from the rules repository 111, to determine which of the currently available CSR's are considered to be experts capable of efficiently addressing the user's anticipated problem. It then instructs the call routing unit 121 to forward the queued up call from the mobile handset 131 to the appropriate CSR (determined to be the expert) currently using the CSR unit 123. The CSR, currently working on the unit 123, is also provided with a list of known problems (or the most frequent ones encountered) with devices of the type (make, model, versions, OS, etc.) to which the mobile handset 131 belongs.

Thus, the CSR is empowered with the information needed to solve the known problems, employing known solutions, diagnosing problems by known symptoms, etc. The CSR views the device profile, known problem-solution pairs, etc. even before the user of the mobile handset 131 has spoken to the CSR to explain the problem encountered, or details of service interruptions experienced.

The present invention provides a customer care system and supports a method for call routing in the CSR call-centers (such as those located within typical wireless operator networks) that is based on a subscriber's problem to be solved, Smartphone usage, behavioral profiles and device profiles. This approach allows for an incoming call, which is typically queued at the incoming call queue 119, to be routed to a CSR unit 123, based on the best match between the CSR skill set, a phone type, a subscriber's area of problem and other related information. Such a best match is conducted by the mobile care engine 113, employing the rules engine 117 and/or the analytics engine 115.

In one embodiment, after obtaining device-specific profiles from subscriber devices, such as the mobile handset 131, the call routing unit 121 of the operator network 105 matches them with the CSR skill set available in a repository or database, such as the CSR skill set database 125, to determine at least one CSR unit 123 (or associated CSR) determined to be capable of addressing the subscriber's support needs. The CSR identified for the assignment is expected to be an expert on such mobile handsets 131, thus making it possible to provide customer service geared towards the highly specialized nature of these mobile handsets 131.

In general, in most wireless customer care scenarios, the same problem is solved over and over again by different CSR from ab initio. The present invention provides a mechanism where business logic is translated in to rules that can be reused, shared and modified on the fly, whereby tremendous efficiency is achieved. This way, once a problem has been solved for a particular mobile handset 131, such as a Smartphone (of a specific make, model and version), the next time another Smartphone subscriber calls with the same problem or issue, the CSR associated with the call does not have to start from scratch; instead the CSR leverages the known/existing solution previously encountered and saved in a database or repository (such as the rules repository 111). Now furthering this argument, the present invention incorporates a method of automating rule creation through analytics that automates the rule creation process, based on device profile data analysis, the trends in the data and Smartphone issues/problems. The automatic creation of rules speeds up the process and thus improves response time; thereby increasing customer satisfaction.

In one embodiment, a customized device emulator that emulates the mobile handset 131 is pre-spawned on a CSR desktop based on the Smartphone profile retrieved from the mobile handset or from the rules repository 111, to further increase the effectiveness of customer care and to reduce the duration of customer service calls.

In one embodiment, the CSR skill set is measured and ranked based on the data gathered, or loaded from external system, over a period of time and analyzed at regular intervals. The CSR skill set is used to determine an appropriate CSR to handle an incoming customer service call from the mobile handset 131.

In one embodiment, a system based on the present invention conducts call routing based on subscriber profile, device profile, CSR skill set and wireless data device problems. It results in faster, more efficient and more accurate customer support for the rapid resolution of issues. Benefits of this method of routing customer service calls to CSRs include:

Reduced overall resolution times

Reduced Average Call Handling Times (ACHT)

Reduced number of call escalations

Superior method of diagnosis through applying rules-based scenarios to identify inconsistencies in current configuration settings Reduction in "human error".

Increased customer satisfaction

In one embodiment, the call routing unit 121 of the operator network 105 relies on matching phone type, problem type and the CSR skill set that may be retrieved from the CSR skill set database 125. The profile of the phone is extracted, either from the mobile handset 131 or from a database, such as the rules repository 111 or a different device capability database, and matched against the information retrieved from the CSR skill set database 125. The CSR skill sets that are provided by the CSR skill set database 125 can be defined in two different ways, manually or automatically:

1) Manually defining CSR skill sets

2) Intelligent system that learns over time

In one embodiment based on manually defining CSR skill sets, the operator network (or more specifically, the CSR skill set database 125) provides an interface through which the skill set can be added, when setting up CSR users for the system. At setup or at the creation of each CSR account, the CSR's skill set is manually entered into the CSR skill set database 125. For example, two new CSR accounts may be added; one CSR as an expert in the PalmOS and the other as an expert in SymbianOS. At the time of account creation for one PalmOS is chosen and for the other SymbianOS preferably from a drop down menu. When a subscriber calls into the support center, the subscriber's device is profiled, and based on the OS of the subscriber's mobile handset 131, the call is routed to the appropriate CSR.

In another embodiment, that is based on an intelligent CSR database system that learns over time, the CSR's prior performance is taken into consideration. The CSR's skill set is continuously (or periodically) assessed based on the type of problem the CSR is determined to be adept at solving, and the time it took to resolve those problems. If the CSR consistently performs better than the defined thresholds, then the CSR's skill set level is upgraded. In this approach, prior performance examination both long term and short term performance is taken into account.

In one embodiment, if a CSR is having a bad day and consistently performing under par, his skill set level is dropped. Different weights and time periods lengths is used and these are configurable parameters.

In one embodiment, an intelligent and automated process of populating the CSR skill set database 125 is employed, that relies on the data being gathered by the operator network 105 over a period of time. This accumulated historical data regarding problems and the solutions, provided by different CSRs, and the time it took to solve the problem, are used for decision making.

In one embodiment, every time a CSR provides a solution to a particular wireless data device and a particular bug, the data regarding the solution is captured by SmartNotes, a component that is part of the CSR skill set database 125. This historical data can also be imported from existing systems in an operator's network, a "Trouble Ticket Systems", if they are being captured there.

In general, incoming calls from callers to a call center supported by an operator network 105 goes in to a queue, called the incoming call queue 119. Irrespective of phone and subscriber profile each person who responds to a call is now sent to a CSR who is either an expert in the device or has displayed sufficient expertise in solving problems related to similar devices. Thus, the time taken to ascertain and fix problems with the subscriber's mobile handsets 131 by CSRs is significantly reduced. If the operator network 105 provides subscriber profile (rate plan, etc.) it is possible to provide a higher priority to subscriber's of a specific rate plan or subscriber class (such as premier subscribers are corporate subscribers).

In one embodiment, based on the kind of mobile handset 131, an incoming call for customer care is forwarded to a CSR. For example, one of N CSRs determined to be experts on a particular problem is assigned to an incoming call for customer care, based on of mobile handset 131 and a device profile retrieved from the mobile handset 131.

Figure 2:
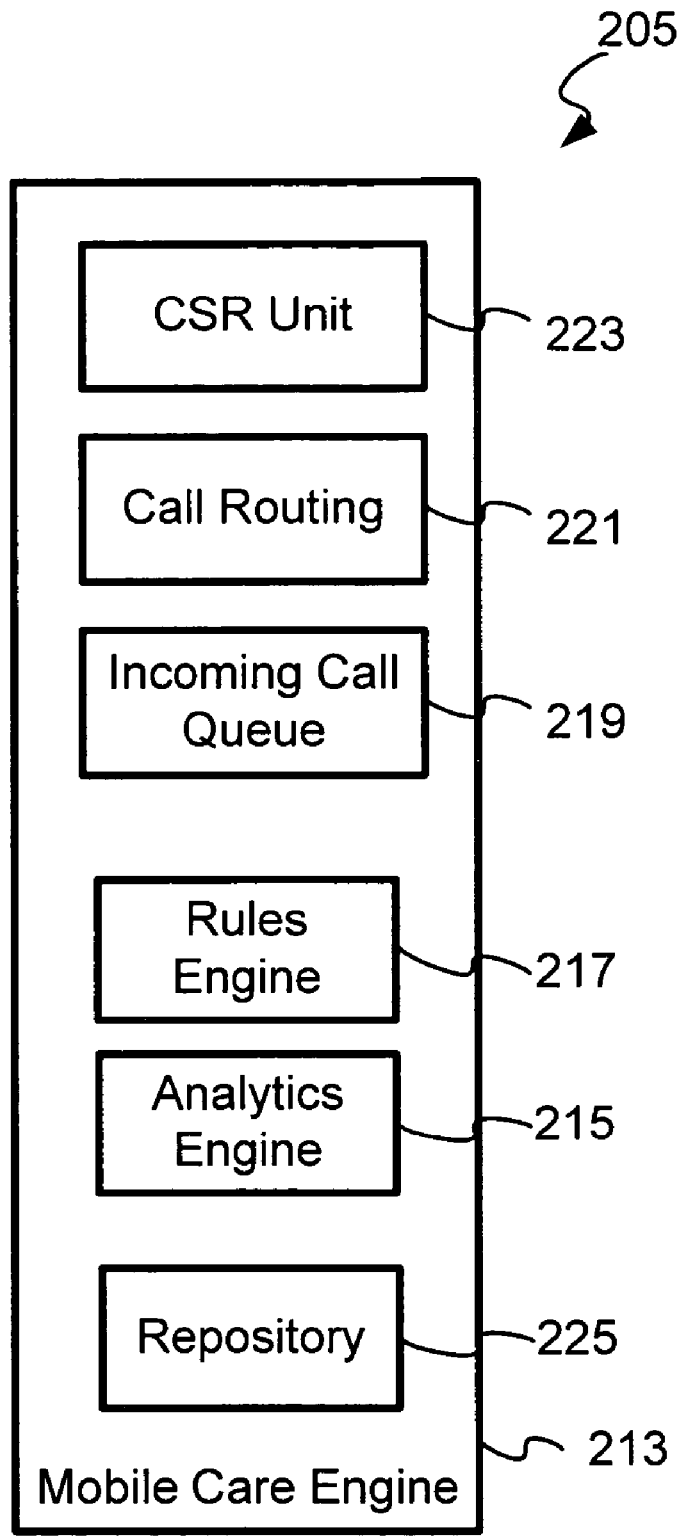
FIG. 2 is a perspective block diagram of a mobile care engine 23 that is used by an operator network for smart customer care wherein a device profile is retrieved from a device, or ascertained from the device, while the user of the device is in a incoming call queue waiting to be connected to a CSR.

FIG. 2 is a perspective block diagram of a mobile care engine 213 that is used by an operator network for smart customer care wherein a device profile is retrieved from a device, or ascertained from the device, while the user of the device is in a incoming call queue 219 waiting to be connected to a CSR. The mobile care engine 213 comprises an analytics engine 215, a rules engine 217, the incoming call queue 219, a call routing system 221, at least one CSR unit 223 and a repository 225.

In one embodiment, the rules engine 217 and the analytics engine 215 retrieve rules and raw data from the repository 225. Similarly, a CSR's problem solving records, performance information, a CSR expertise information, etc. are saved in the repository 225. The call routing system 221 routes incoming calls queued up in the incoming call queue 219 to an appropriate CSR unit 223 based on rules executed by the rules engine 217. The CSR unit 223 determines potential solutions based on analytical rules executed by the analytical engine 215.

Figure 3:
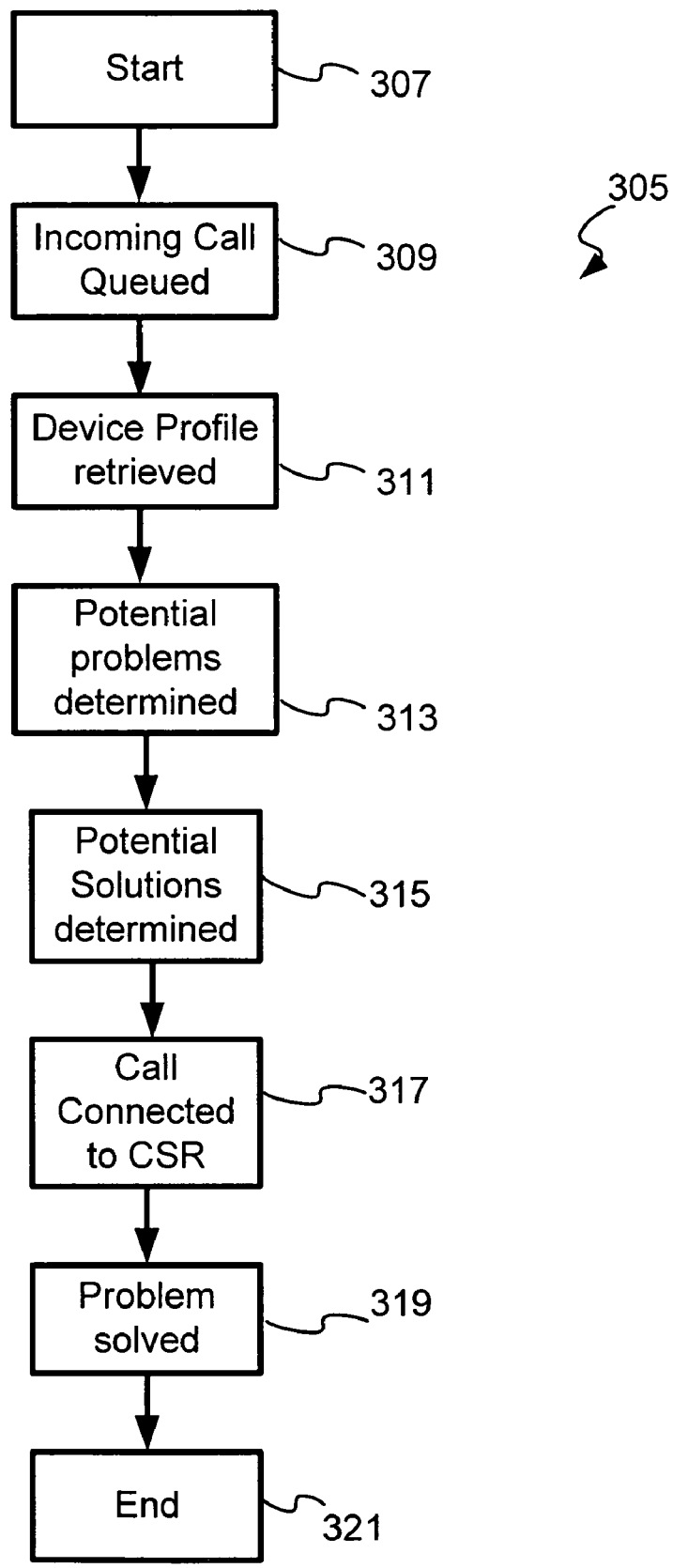
FIG. 3 is a flow chart of an exemplary operation of the smart customer care center within an operator network that is capable of routing incoming customer care calls based on a subscriber profile and a customer service representative (CSR) skill set.

FIG. 3 is a flow chart of an exemplary operation of the smart customer care center within an operator network 105 that is capable of routing incoming customer care calls based on a subscriber profile and a customer service representative (CSR) skill set. At the start block 307, the processing starts when the user's customer care call is initiated using a mobile handset. At the next block 309, the incoming call is queued up. Then, at a next block 311, the smart customer care center retrieves a device profile from the mobile handset whose customer care call is queued up. In one embodiment, the device profile is retrieved over a TCP/IP network. In another, over an SMS based communication channel.

Then, at a next block 313, based on the device profile retrieved, the subscriber's subscriber class information retrieved, and other related information, the potential problems, such as known problems, are determined. Then, at a next block 315, potential solutions, that are either known solutions or solutions suggested by the rules engine, are retrieved.

Later, at a next block 317, the user's customer care call that is queued up is connected to a CSR determined to be an appropriate CSR to handle the incoming call. Such determination is done based on rules executed by the rules engine. The CSR reviews the potential problems, associated solutions and device profile information while interacting with the user.

Then, at a next block 319, the CSR determines an appropriate solution and solves the user's problem. In one embodiment, the solution is determined to be a change in configuration, such as a change in an SMTP server, a POP server setting or connectivity parameters. The CSR initiates a configuration change and verifies that the change did take place. In another embodiment, the solution to the problem is determined to be a firmware update and the CSR initiates a firmware update of the mobile handset being used by the user. In yet another embodiment, the CSR determines that the solution requires a combination of firmware update, a software update and a configuration change, and the CSR sets up these update activities for subsequent update of the mobile handset. In a different embodiment, the CSR initiates diagnostic data collection in the mobile handset for further analysis.

Finally, at an end block 321, the processing ends with a satisfied user and a mobile handset that functions better due to the solution of a problem or the fixing of a configuration setting, etc.

Figure 4:
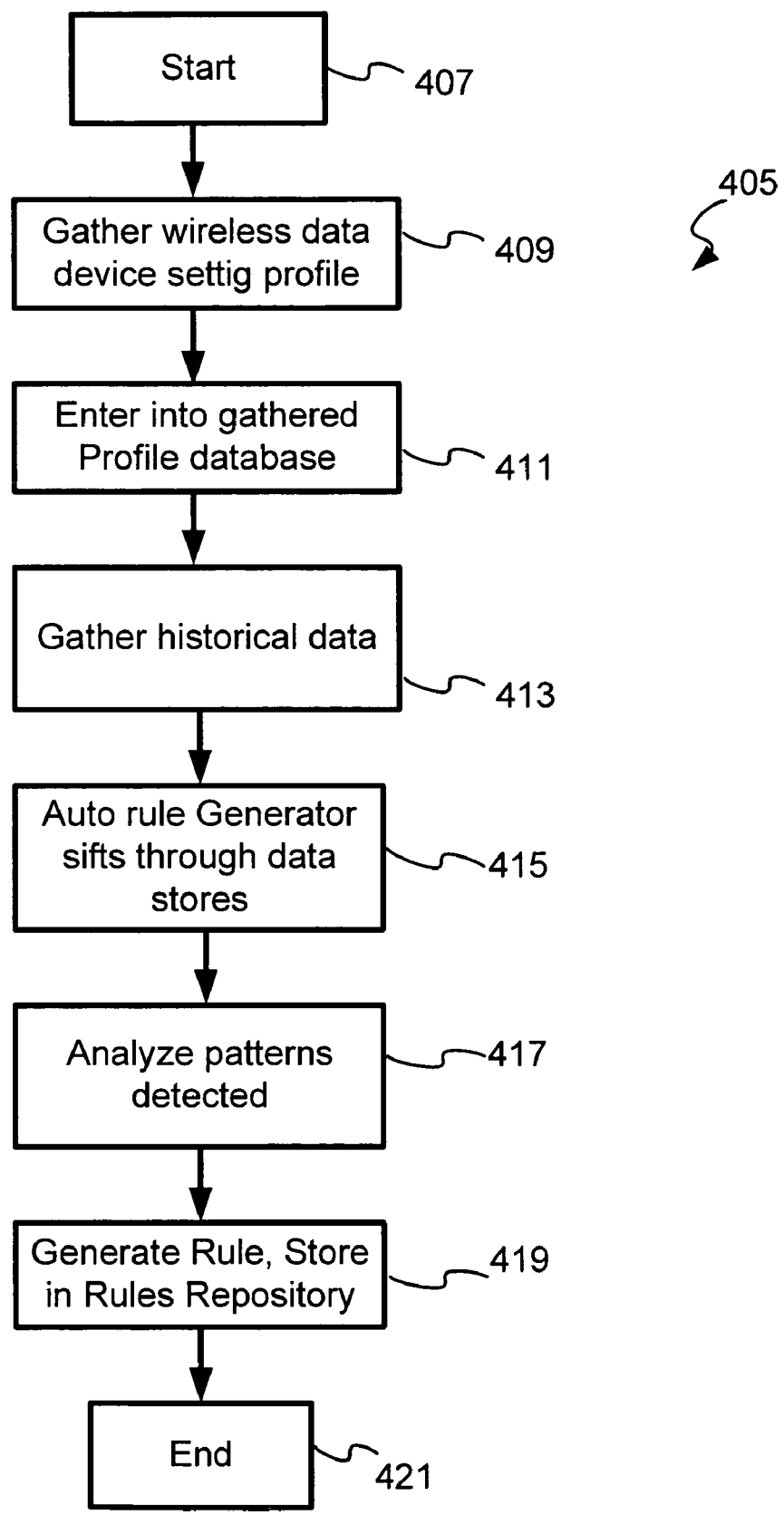
FIG. 4 is a flow chart of an exemplary method of automatic rule creation through pattern detection and analytics conducted by an auto rules generator that is part of a smart customer care system.

FIG. 4 is a flow chart of an exemplary method of automatic rule creation through pattern detection and analytics conducted by an auto rules generator that is part of a smart customer care system. At a start block 407, the processing starts when a device is encountered. Then, at a next block 409, the wireless data device setting profile is gathered from the device. Then, at a next block 411, the gathered profile is put in the data store "Gathered Profile".

Then, at a next block 413, historical data is also gathered by SmartNotes database of the smart customer care system, based on point solutions provided by the CSRs. Then, at a next block 415, using the "Auto Rule Criteria", the auto rule generator sifts through the different data stores that contains all the collect data, historical or otherwise. Then, at a next block 417, any patterns detected in the data are analyzed further. Once a criteria for the creation of a rule is met in a detected pattern, and enough patterns emerge in the historical data that satisfies the conditions set by the criteria, the auto rule generator creates a new rule.

Then, at a next block 419, the newly generated (auto generated) rule is then stored in the rules repository. These rules at first may then be only applied to a limited number of wireless data devices, and once proven to be robust, are put into production. Finally, at the end block 421, the processing stops.

Figure 5:
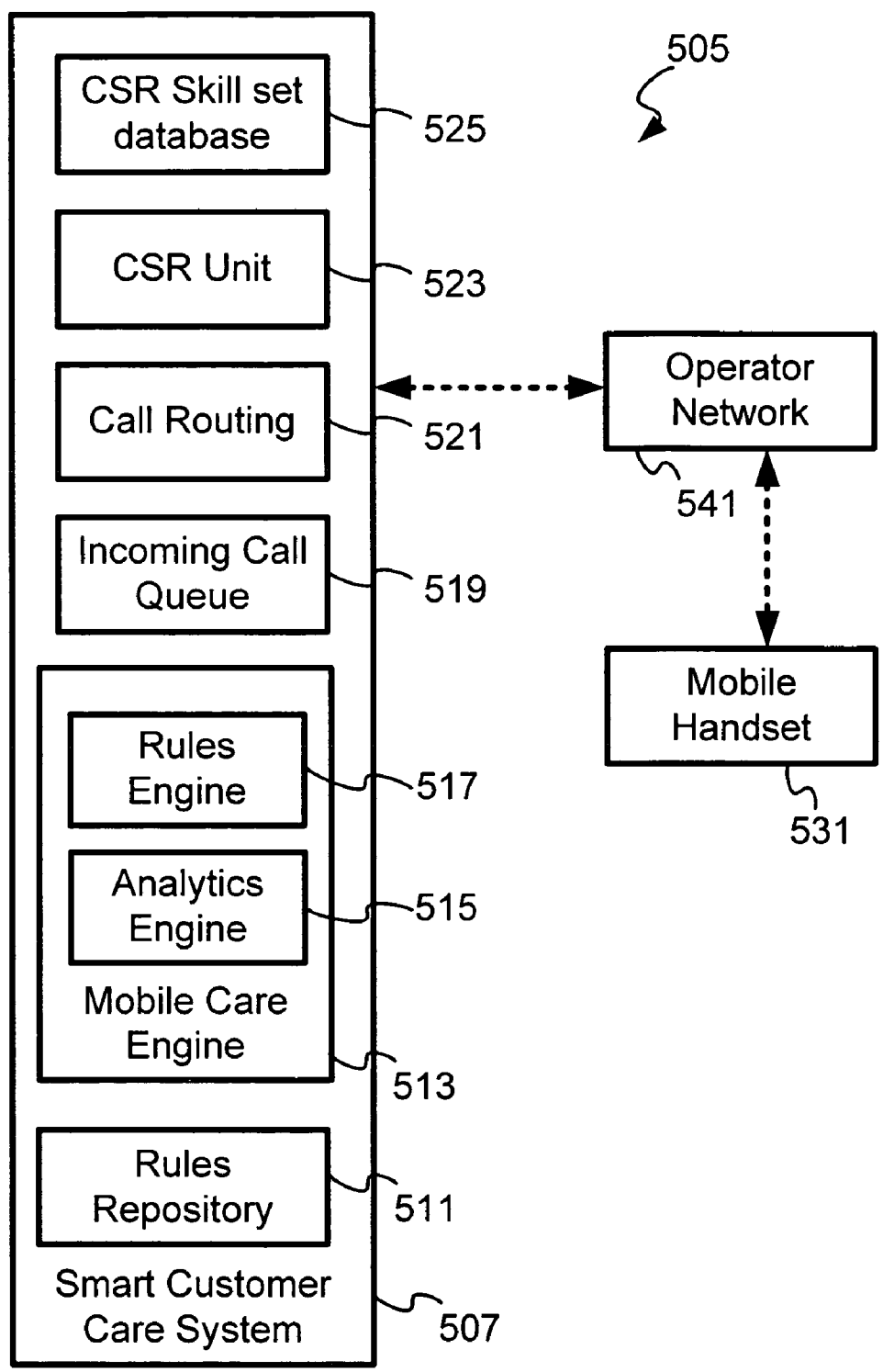
FIG. 5 is a perspective block diagram of a smart customer care system that provides an operator network with the capability of routing incoming customer care calls from a mobile handset to one of a plurality of customer care units based on a device profile retrieved from the mobile handset, rules related to performance of customer care representatives that exist in the rules repository, etc.

FIG. 5 is a perspective block diagram of a smart customer care system 507 that provides an operator network 541 with the capability of routing incoming customer care calls from a mobile handset 531 to one of a plurality of customer care units 523 based on a device profile retrieved from the mobile handset 531, rules related to performance of customer care representatives that exist in the rules repository 511, etc. The smart customer care system not only makes it possible to route incoming calls, initially queued up in an incoming call queue 519, to an appropriate CSR, but also facilitates resolution of a customer's problems employing analytics processed by an analytics engine 515 and rules processed by a rules engine 517.

The smart customer care system 507 employs rules that are executed by the rules engine 517 to determine which customer care representative should be handling an incoming customer care call from the mobile handset 531. The rules employ a device profile and a subscriber profile, as necessary, to determine to which CSR the customer care should be routed. It also employs a CSR skill set database to determine which CSR has the necessary expertise to handle the call. It attempts to find a best match and determines a target CSR for the incoming customer care call. If a best match cannot be found, or if multiple CSRs are determined to be capable of handling the call, it targets one of them for handling the incoming call. Such targeting being based on additional rules used to resolve targeting or on preset default behavior.

The analytics engine 515 employs additional rules to determine what is wrong with the mobile handset. It employs information retrieved from the mobile handset, such as the device profile, to determine problems with connectivity, configuration, application behavior, etc. It also flags additional information that is needed for problem resolution, and highlights them to the CSR so that the CSR might ask the user for such information or retrieve them from the device, or from a self-care portal to which the user of the mobile handset 531 may have used previously.

In one embodiment, the smart customer care system 507 is part of the operator network 541. In another embodiment, the smart customer care system 507 is part of a customer care center that is external to the operator network 541, such as one managed by an OEM.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A customer care system for mobile devices, the customer care system comprising:
a plurality of customer care representative units, each associated with a customer care representative;
a call handling server capable of handling a plurality of customer care calls from at least some of the mobile devices;
a customer care server communicatively coupled to the call handling server that facilitates diagnosis of the at least some of the mobile devices and the selective modification of the at least some of the mobile devices; and
the customer care server routing each of the plurality of customer care calls to one of the plurality of customer care representative units based on expertise information of customer care representatives and a device profile retrieved from the at least some of the mobile devices during the customer care call.

2. The customer care system of claim 1 wherein the customer care server retrieves a device profile from each of the at least some of the mobile devices to route the associated one of the plurality of customer care calls to one of the plurality of customer care representative units.

3. The customer care system of claim 2 wherein the device profile comprises at least one of a manufacturer identification, a model identification, a firmware version, a software version, a hardware versions and a subscriber identification.

4. The customer care system of claim 2 wherein the customer care server retrieves the device profile from each of the at least some of the mobile devices while the each of the at least some of the mobile devices is communicatively coupled to the call handling server for customer care service.

5. The customer care system of claim 2 wherein the expertise information comprises a mapping of the customer care representatives to a device profile.

6. The customer care system of claim 2 wherein the expertise information comprises a mapping of the customer care representatives to a mobile device platform.

7. The customer care system of claim 2 wherein the expertise information comprises a mapping of the customer care representatives to a mobile device operating system.

8. The customer care system of claim 2 wherein the customer care server employs a management server to retrieve the device profiles from the at least some of the mobile devices to route each of the plurality of customer care calls.

9. The customer care system of claim 2 wherein the retrieving of the device profile occurs while the mobile devices are on hold at the call handling server in order to obtain a customer care service.

10. A customer care system operated in an operator network and used by a plurality of customer care representatives, the customer care system comprising:
a customer care server;
a plurality of customer care representative units communicatively coupled to the customer care server, each of the plurality of customer care representative units capable of being used by at least one of a plurality of customer care representatives;
the customer care system capable of routing an incoming customer care call from a mobile device to a specific customer care representative unit among the plurality of customer care representative units based on a device profile retrieved from the mobile device during the customer care call, and based on a customer care representative (CCR) skill set associated with one of the plurality of customer care representatives currently using the specific customer care representative unit.

11. The customer care system of claim 10 wherein the device profile is retrieved from the mobile device while the mobile device is communicatively coupled to the customer care system for customer care service.

12. The customer care system of claim 11 wherein a subscriber profile is retrieved from the mobile device while a user employs the mobile device to establish an incoming customer care call with the customer care system.

13. The customer care system of claim 11 wherein the device profile is retrieved while the user employing the mobile device for the customer care service is in a call handling queue waiting to be connected to the customer care representative.

14. The customer care system of claim 13 wherein the customer care server tracks the performance of a plurality of customer care representatives to determine their expertise and collect an expertise information and wherein the customer care call from the mobile device is routed to one of the plurality of customer care representatives based on the expertise information and the device profile retrieved from the mobile device.

15. The customer care system of claim 14 wherein expertise information comprises at least one of a skill set associated with the plurality of customer care representatives, types of problems solved by the plurality of customer care representatives, types of devices handled by the plurality of customer care representatives and a history of problems solved by the plurality of customer care representatives.

16. A method of providing customer care to a user of a mobile device in a customer care system, the method comprising:
queuing an incoming customer care call from the mobile device;
selecting a target customer care representative (CCR) from a plurality of customer care representatives, based upon a device profile retrieved from the mobile device during the customer care call;
presenting the device profile from the mobile device to the target customer care representative; and
assigning the target customer care representative to the incoming call.

17. The method of providing customer care according to claim 16 wherein queuing comprises:
   putting the incoming call on hold, in an incoming call queue, until a CCR is assigned to the incoming call.

18. The method of providing customer care according to claim 17 wherein selecting comprises:
   retrieving the device profile associated with the mobile device;
   comparing at least a portion of the device profile to a skill set associated with the plurality of customer care representatives; and
   identifying one of the plurality of customer care representatives as the target customer care representative.

19. The method of providing customer care according to claim 18 wherein comparing comprises:
   processing rules by a rules engine to determine a best fit representative among the plurality of customer care representatives, wherein the rules engine employs rules related to at least one of a skill set associated with the plurality of customer care representatives, types of problems solved by the plurality of customer care representatives, the types of devices handled by the plurality of customer care representatives and the history of problems solved by the plurality of customer care representatives.

20. The method of providing customer care according to claim 16 further comprising:
   receiving a subscriber information; and
   displaying at least a portion of the subscriber information to the customer care representative.

21. The method of providing customer care according to claim 18 wherein retrieving the device profile comprises accessing the device profile from at least one of the mobile device, a self-care portal used by the user of the mobile device and a local database comprising the device profile.

22. The method of providing customer care according to claim 21 wherein the device profile comprises at least one of a make, a model, a hardware version, a software version, a platform information, a device capability list and a list of applications, all of these associated with the mobile device.

23. The method of providing customer care according to claim 22 wherein the presenting comprises:
   displaying at least a portion of the device profile;
   highlighting a list of potential problems with the mobile device; and
   providing a list of potential solutions for at least one of the potential problems.

* * * * *

UNITED STATES PATENT AND TRADEMARK OFFICE
CERTIFICATE OF CORRECTION

PATENT NO. : 7,401,320 B2 Page 1 of 1
APPLICATION NO. : 11/247459
DATED : July 15, 2008
INVENTOR(S) : Jeffrey Brunet et al.

It is certified that error appears in the above-identified patent and that said Letters Patent is hereby corrected as shown below:

In column 10, line 43, in Claim 14, after "collect" delete "an".

Signed and Sealed this

Twenty-third Day of December, 2008

JON W. DUDAS
*Director of the United States Patent and Trademark Office*